G. S. WEBB.
TIRE RIM CONTRACTING AND EXPANDING DEVICE.
APPLICATION FILED NOV. 10, 1920.
1,410,631. Patented Mar. 28, 1922.
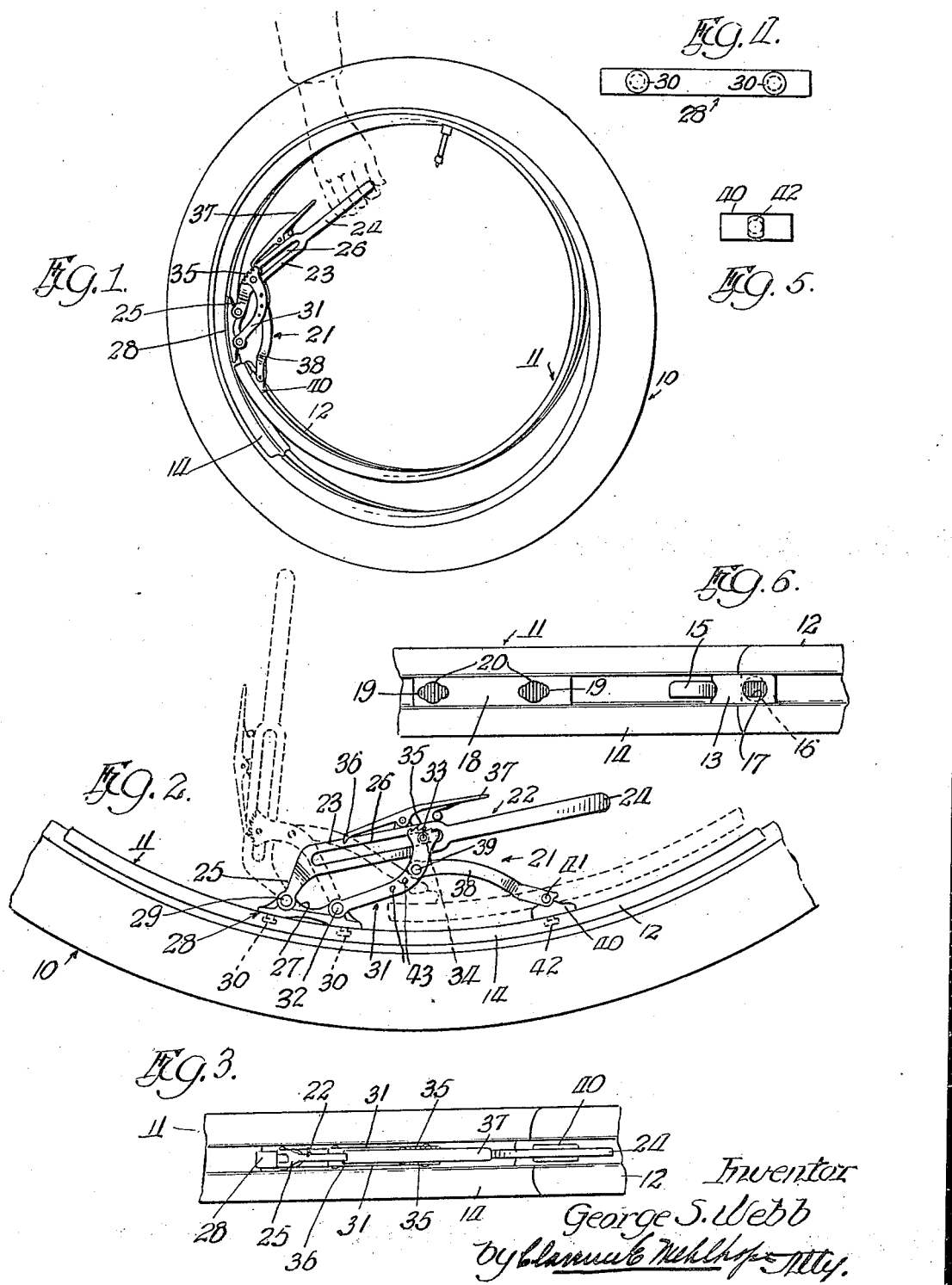

UNITED STATES PATENT OFFICE.

GEORGE S. WEBB, OF AURORA, ILLINOIS.

TIRE-RIM CONTRACTING AND EXPANDING DEVICE.

1,410,631.           Specification of Letters Patent.           Patented Mar. 28, 1922.

Application filed November 10, 1920. Serial No. 423,101.

*To all whom it may concern:*

Be it known that I, GEORGE S. WEBB, a citizen of the United States, and a resident of Aurora, in the county of Kane and State of Illinois, have invented certain new and useful Improvements in Tire-Rim Contracting and Expanding Devices; and I do hereby declare that the following is a full, clear, and exact description thereof, reference being had to the accompanying drawings, and to the letters of reference marked thereon, which form a part of this specification.

This invention relates to improvements in tire rim contracting and expanding devices, and consists of the matters hereinafter described and more particularly pointed out in the appended claims.

The primary object of the invention is to provide a device for quickly and easily removing a split spring rim from, or applying the same to, a pneumatic tire.

A further object of the invention is to so construct the device, that when the same has been applied to a rim, and has been actuated to contract the same for its removal from a tire, said rim is held in this contracted condition, ready to be positioned within the tire, and then released so that it may again expand into place upon said tire.

The above mentioned objects of the invention, as well as the several advantages thereof, will more fully appear as I proceed with my specification.

In the drawings:—

Figure 1 is a perspective view of a rim contracting and expanding device, embodying my invention, and illustrates the same as applied to a tire rim, which is held in a contracted condition, ready for its quick and easy removal from a pneumatic tire.

Figure 2 is a view in side elevation, of my improved device, as it appears when in position, ready to contract the tire.

Figure 3 is a top plan view of the parts shown in Figure 2.

Figures 4 and 5 are face views of the bottoms of rim engaging shoe blocks embodied in my invention, and which will be more specifically referred to later.

Figure 6 is a top plan of the abutting ends of a split spring rim to which my improved device is especially adapted.

Referring now in detail to that embodiment of the invention illustrated in the accompanying drawings:—10 indicates a pneumatic tire casing, and 11 indicates the rim therefor. As shown, said rim is of the split spring ring type which, when contracted, is reduced in diameter so that it may be removed from the tire, and which, when it is in its normal expanded condition, fits snugly upon and engages the beads of said tire. One end 12, of the rim (see Figure 6) has a block 13, on its inner periphery, which overhangs the other end 14 of the rim and engages an inclined stop lug 15 thereon in a manner locking the rim in its expanded condition. In the block 13 is provided a recess 16 which has an entrance opening 17 so formed that a part of the recess 16, projects beyond the sides of the entrance opening, which is elongated in a direction longitudinally of the rim. Fixed to the end 14, a short distance from the lug 15 thereon, is a second block 18 in which are provided elongated recesses 19, the middle parts of which are increased in diameter as at 20.

21 indicates as a whole my improved contractor and expander. It comprises an operating lever 22, which includes a body portion 23, a parallel handle extension 24 at one end thereof, and an angularly disposed fulcrum extension 25 at the other end thereof. In said body portion is a longitudinal slot 26. The fulcrum extension is spread laterally to embrace one end of a rib 27 on the top surface of an elongated shoe block 28, a pin 29 passing through the extension end 25 of the lever and the rib 27 on said block to provide the fulcrum for said lever.

The block 28 has two lugs 30—30 on its bottom surface, which are adapted to seat and have locking engagement in the recesses 19 before referred to. As shown, each lug has an enlarged outer end which is adapted to be passed through the enlarged part 20 of an associated recess 19, after which a short endwise movement is imparted to said block when the necks of smaller diameter of said lugs will engage in the narrower ends of said recesses and lock the same in place therein.

31 indicates a power transmitting member or link having the form of a suitably curved lever, which is made up of two similarly formed plates, located one on each side of the operating lever 22. The bottom ends of the plates of said links engage on opposite sides of the other end of said rib 27 of the block 28 and a pin 32 passes therethrough to provide the pivotal connection between said link and said block. The other ends of said plate embrace the sides of the body 23 of the lever 22 and are secured together by a rivet 33 which extends through the slot 26 in said body. Preferably a roller 34 (see Figure 2) is mounted on the rivet 33 in said slot. The adjacent ends of the said side plates have ratchet teeth 35 which are adapted to be engaged by the detent end 36 of a spring pressed lever or dog 37, mounted on the body part of actuating lever 22.

38 indicates a second link which is pivoted at one end to the link 31, between the side plates thereof, and preferably nearer the ratchet toothed end of said link 31 than the other, by means of a pin 39. This second link is pivoted at its other end to a second shoe block 40 by a pin 41, which shoe block is adapted to be releasably attached to the end 12 of the rim. As shown, said shoe block has a lug 42, which includes a transversely elongated head adapted to have locking engagement in the recess 16 of the block 13 on the rim end 12. If desired, a plurality of holes 43 may be provided in the link 31 for the pin 39 to provide for an adjustment between the said link so as to fit any size of rim, and thus compensate for the different distances between the blocks 13 and 18 on different rims.

The manner of application and the operation of my improved device is as follows:— Assume that a rim of the kind described is on a tire, and it is desired to remove said rim. The device is grasped in its open position as shown in full lines in Figure 2 and is held in a position at right angles to the rim, and the lug 42 on the shoe block 40 inserted in the recess 16 in the block 13 of the rim end 12. After this has been done, the device is swung about said lug and recess as a pivot, toward the other rim end, until the lugs 30 on the shoe 28 register with and then enter the recesses 19 in the block 18 on said rim end 14. The device is now arranged in the plane of the median line of the rim as shown in Figure 3. The handle 24 is grasped and a pull is exerted thereon. This will cause the roller 34 of the link 31 to move in the slot 26 toward the fulcrumed end of the lever 22, and will act to transmit the pull to the link 31. The end 12 of the tire rim will ride over the inclined stop lug 15, and thus release or disengage said ends 12 and 14, from locked engagement, said end 12 moving over the end 14 and thus contracting the rim. In the movement of the several parts, the ratchet end of the link 31 will click or sweep past the detent end 36 of the dog 37, which will lock the parts as soon as the pull is discontinued, and the rim is thus locked in its contracted position. It will be noticed that the link 31 provides a pivotal connection between the lever and second link 38, which moves toward the fulcrum of the lever, as the same is swung to bring the blocks 28—40 toward each other, and thus the power imparted to the pawl is increased as the load increases, which load is the resistance of the natural expansive tendency of the rim. Thus, with the rim contracted, its diameter is materially reduced so that it may be removed, together with the device in position thereon from the tire.

To replace the rim, it is entered into the plane of the tire, with the tire valve stem extending through the usual hole therefor in the rim and the end 14 of the rim in position on the tire beads. The dog 37 is actuated to release the link 31, and the rim will spring back to its almost normal expanded condition on the tire. Should the end 12 of the rim overlap the end 14, a push is imparted to the handle 24 of the lever, which will tend to increase the distance between the shoe blocks 28 and 40 until the part 13 on the rim end 12 snaps past the inclined lug 15 when the rim is in its fully expanded position. The device is then shifted longitudinally to bring the lugs 30 of the shoe 28, into register with the enlarged parts 20 of the recesses 19 when a lift is imparted to that end of the device to disengage the block 28 from the rim. The device is then swung about the lug 42 of the block 40 into a position at right angle to the rim so that the elongated head of said lug may be withdrawn from the recess 16.

My improved contracting and expanding device possesses many advantages. As the resistance of the rim toward contraction increases, the leverage on the second link 38 increases or is compounded to counteract the same. Thus it easily contracts the rim and then holds it in this condition, permitting its ready removal from, or quick attachment to, the tire. It is small and compact, and takes up but little room in the tool box.

While in describing my invention, I have referred to certain details of mechanical construction and arrangement of parts, I do not wish to be limited thereto except as may be pointed out in the appended claims.

I claim as my invention:—

1. A tire rim contracting and expanding device, comprising a pair of shoe blocks adapted for removable attachment to a tire rim, a main operating lever fulcrumed on one of said blocks, a link pivotally connected to the other shoe block, means providing a movable pivotal connection of said link with said operating lever adapted to bring the axis of said pivotal connection toward said lever fulcrum as the lever is swung on its fulcrum to bring the shoe blocks together, and means for locking said pivotal connection at a predetermined point in its movement toward said fulcrum.

2. A tire rim contracting and expanding device, comprising a pair of shoe blocks adapted for removable attachment to a tire rim, an operating lever fulcrumed on one of said shoe blocks, a link connected to said first named shoe block and having a movable pivotal connection with said operating lever, a second link pivoted to the other shoe block and to said first mentioned link, and a device for releasably locking said first mentioned link when it has reached a predetermined point in its sliding movement toward the fulcrumed end of said lever.

3. A tire rim contracting and expanding device, comprising a pair of shoe blocks adapted for removable attachment to a tire rim, an operating lever fulcrumed on one of said shoe blocks, a link connected at one end to the first mentioned shoe block, a second link pivoted to the other shoe block, and to the first link between its ends, said first mentioned link also having a slidable pivotal connection at its other end with said operating lever, and a device on said operating lever for releasably locking the first mentioned link when it has reached a predetermined point in its sliding movement toward the fulcrumed end of said lever.

4. A tire rim contracting and expanding device comprising a pair of shoe blocks adapted for removable attachment to a tire rim, an operating lever having a longitudinal slot therein, fulcrumed on one of said shoe blocks, a link connected at one end to the first mentioned shoe block, a second link pivoted to the other shoe block and to the first link between its ends, a roller on the other end of said first mentioned link engaged in the slot in said operating lever, and a device for releasably locking said first mentioned link when the roller has reached a predetermined point in its movement in said slot toward the pivoted end of said lever.

5. A tire rim contracting and expanding device, comprising a pair of shoe blocks adapted for removable attachment to a tire rim, an operating lever fulcrumed on one of said shoe blocks, a link connected at one end with said first mentioned shoe block, the other end of said link being provided with ratchet teeth and having a slidable pivotal connection with said operating lever, a second link pivoted to the other shoe block and to the first link between its ends, and a locking dog carried on said operating lever, which is adapted to engage the ratchet teeth on said first mentioned link, when it has reached a predetermined point in its sliding movement toward the pivoted end of said operating lever.

6. A tire rim contracting and expanding device, comprising a pair of shoe blocks adapted for removable attachment to a tire rim, an operating lever having a longitudinal slot therein, fulcrumed on one of said shoe blocks, a link comprising two spaced side plates, which are pivotally connected at one end to said first mentioned shoe block and embracing at its other ends, the sides of said operating lever, said last mentioned end of the link having ratchet teeth thereon, a roller carried between the ratcheted ends of said side plates, which roller has a sliding bearing in said slot in said operating lever, a second link pivoted at one end to the other shoe block, and at its other end to about the middle of said first mentioned link, and a dog carried by the operating lever for engaging the ratchet teeth on said first mentioned link for locking the same to the lever when the roller has reached a predetermined point in its sliding movement in said slot.

In testimony that I claim the foregoing as my invention, I affix my signature in the presence of two witnesses, this 6th day of November, A. D. 1920.

GEORGE S. WEBB.

Witnesses:
T. H. ALFREDS,
CHRISTINA DEANS.